United States Patent [19]

Soneira

[11] Patent Number: 5,159,436
[45] Date of Patent: Oct. 27, 1992

[54] TECHNIQUE FOR DETECTING COLOR MISREGISTRATION AND MISCONVERGENCE IN VIDEO COLOR DISPLAYS AND CAMERAS

[75] Inventor: Raymond Soneira, Rumson, N.J.

[73] Assignee: Cactus Computers, Inc., Rumson, N.J.

[21] Appl. No.: 694,878

[22] Filed: May 2, 1991

[51] Int. Cl.$^5$ .............................................. H04N 17/04
[52] U.S. Cl. .................................... 358/10; 315/368.18
[58] Field of Search ........................ 358/10, 65, 139; 315/368.11, 368.18

[56] References Cited

U.S. PATENT DOCUMENTS

| | | | |
|---|---|---|---|
| 2,594,382 | 4/1952 | Bedford | 358/10 |
| 2,594,383 | 4/1952 | Bedford | 358/10 |
| 3,731,134 | 5/1973 | Iida | 315/21 |
| 3,916,437 | 10/1975 | Barbin | 358/10 |
| 4,001,877 | 1/1977 | Simpson | 358/10 |
| 4,180,829 | 12/1979 | Pires | 358/10 |
| 4,201,932 | 5/1980 | Smith | 315/13 |
| 4,203,054 | 5/1980 | Sowter | 315/368 |
| 4,316,211 | 2/1982 | Mackey et al. | 358/10 |
| 4,562,469 | 12/1985 | Graham | 358/139 |
| 4,628,342 | 12/1986 | Desmons et al. | 358/10 |
| 4,635,095 | 1/1987 | Legrand et al. | 358/10 |
| 4,642,529 | 2/1987 | Penn | 315/368 |
| 4,686,429 | 8/1987 | Fendley | 315/368 |
| 4,816,908 | 3/1989 | Colineau et al. | 358/60 |
| 4,835,602 | 5/1989 | Duwaer | 358/60 |
| 4,925,420 | 5/1990 | Fourche et al. | 445/3 |
| 4,963,828 | 10/1990 | Kawame et al. | 324/404 |

FOREIGN PATENT DOCUMENTS 1-204596 8/1989 Japan .
3-85990 4/1991 Japan .

Primary Examiner—James J. Groody
Assistant Examiner—Mark R. Powell
Attorney, Agent, or Firm—Peter L. Michaelson

[57] ABSTRACT

A blinking set of displayed collinear elements alternating in color allows simple, rapid, and accurate determination of color misregistration or misconvergence in color television video displays and color television cameras. Operators can readily detect misconvergence due to a shift in a trend line of the collinear elements which is made quite noticeable by repeatedly switching between two patterns, thereby introducing an apparent blinking motion of the misaligned elements in displayed areas that are misconverged. The blinking motion can also be detected by automatic means, thereby eliminating the need for an operator.

14 Claims, 4 Drawing Sheets

TECHNIQUE FOR DETECTING COLOR MISREGISTRATION AND MISCONVERGENCE IN VIDEO COLOR DISPLAYS AND CAMERAS

FIELD OF THE INVENTION

This invention relates a technique for detecting misalignment among separate color component images produced by a color video display or color video camera.

BACKGROUND OF THE INVENTION

In most color video input and output devices, each primary color that is being scanned or displayed is processed separately. For example, in a color television camera, special optics that include appropriate color filters separate incoming light into its red, green, and blue components, which are then separately imaged onto three monochrome camera sensors. In a projection television display, three Cathode Ray Tubes (CRTs) or Liquid Crystal Display (LCD) light valves are used to separately generate monochrome red, green, and blue images, which are then combined together using special optics. In a computer display or television receiver with a color CRT, three separate electron beams are used to excite red, green, and blue phosphors on the screen.

In order to properly reproduce a complete video image, each of the red, green and blue component color images must be properly aligned with respect to the other such images, so that all these component images will, to a viewer, fuse together into a single displayed color image. This alignment is called color registration or color convergence. In general, color registration is difficult to achieve because of the effects of optical system geometry, optical errors, alignment errors, and nonlinearities in the camera or display devices themselves. For example, in magnetically deflected camera sensors and CRTs, difficulties inherent in precisely and accurately generating proper magnetic fields result in different geometric errors for each primary color. The geometric errors alter a positional correspondence among the primary color images, and therefore adversely affect the color registration. For example, in a 13 inch (approximately 33 cm) (diagonal) television or computer display, a one percent geometric distortion error in only a red channel image will cause portions of the red image to be shifted approximately 0.08" (2 mm) with respect to green and blue channel images. Such a displacement is readily apparent to a viewer. In general, color convergence is never perfect everywhere in the image, and the degree of alignment will generally vary significantly throughout the image. A common practice is to adjust for optimum convergence at the center of the image, i.e., as close to perfect as can be achieved there. Elsewhere the degree of alignment will generally degrade towards the sides and corners of the image, often reaching a maximum at some point along the periphery. This lack of color registration and convergence is called color misregistration or misconvergence.

The effects of color misregistration adversely affect an image in various ways, for example, elements drawn in secondary colors (combinations of the primary colors) will have color variations that are called color fringes. For example, referring to FIGS. 1B and 1C, yellow line 14 drawn on a CRT display screen with misregistered red and green components 15 will have red fringe border 17 on one side, central yellow portion 16, and green fringe border 18 on the other side. As such, the image containing such a line will appear to the viewer to be blurred or out of focus. Furthermore, there will also be a loss of detail in the displayed image because the misregistered components are positionally shifted into adjoining areas, which, in turn, broadens local image detail and causes it to overlap with other image detail. When the misregistration is greater than the line width, separate offset images will appear. These problems are especially serious for High Definition Television (HDTV) and computer displays, where fine image detail, graphics and text characters are often viewed closely by a user.

Most prior art methods for detecting color misregistration use a crosshatch and dot pattern that are drawn, e.g. on a CRT display screen, in a single secondary color. Such a pattern is shown in FIG. 1A. As shown, the pattern contains vertically ruled lines, collectively identified as lines 11, which are useful for detecting color fringing in the horizontal direction, horizontally ruled lines, collectively identified as lines 12, which are useful for detecting color fringing in the vertical direction, and dots, of which dot 13 is illustrative, which are useful for detecting color fringing in either direction. In use, a trained operator examines an image containing a displayed crosshatch and dot pattern for color fringing and makes appropriate adjustments to minimize the misalignment. The procedure is generally performed for each of the secondary colors: yellow, cyan, and magenta in order to test for red-green, blue-green, and red-blue misalignment. With such a crosshatch and dot pattern, the color fringes tend to be difficult to detect because they are often just slivers of light that are not as bright as a centrally aligned secondary color. The primary colors also have different visibilities, for example, blue is difficult to see next to green or red. Also, because of a smooth Gaussian profile of the electron beams used in the CRT display, a misregistration produces a gradual smooth transition to and from the color fringes, making these fringes more difficult to spot than an abrupt and sharp transition. As such, since the operator must scan the image for rather minute color fringes, this process for detecting misregistration using a crosshatch and dot pattern tends to be quite slow and exhibits a low sensitivity to misconvergence and misregistration.

Many automated methods for measuring misregistration separately and successively determine centroids for key areas of a monochromatic test pattern in each of the red, green, and blue primary colors. See, for example, U.S. Pat. Nos. 4,635,095 and 4,988,857. These methods are generally slow and require expensive test equipment. Moreover, a time lag between a sequential measurement of the centroids of each separate color image introduces inaccuracies because of instabilities and drift in the scanning circuits of the camera or display. Other methods actively shift or offset a scanning pattern in order to measure misconvergence. See, for example, U.S. Pat. Nos. 4,642,529 and 4,686,429. These latter methods require that: (a) expensive test equipment be used, and (b) various modifications be made to the scanning circuits in a display device in order for these methods to be used. Since the scanning pattern will necessarily be altered, misregistration tests based upon these latter methods cannot be performed on a device that has not been so modified, i.e. a device that is in normal working order.

SUMMARY OF THE INVENTION

Accordingly, an object of my inventive technique is to provide a method for detecting color misregistration and color misconvergence where an operator, readily and almost effortlessly, visually detects those areas on the display screen that are out of alignment without having to undertake a detailed visual search of an entire displayed image.

Another object of my inventive technique is to reduce the likelihood that the operator will overlook areas of the displayed image that are out of alignment.

A further object of my inventive technique is to reduce the subjective nature of the operator's visual inspection of the displayed image for misalignment.

An additional object of my inventive technique is to increase the visibility of various misregistered colors, such as blue, that are difficult for the operator to see.

Yet another object of my inventive technique is to reduce the time needed for an operator to detect misconvergence as well as to increase the sensitivity and accuracy of the determination.

These and other objects are accomplished, in accordance with my inventive teachings, by using color collinearity and blinking motion to detect and subsequently minimize color misregistration in an image. Specifically, in color collinearity, a line made up of multiple sets of alternating primary colors is produced on a television or display using a camera signal or test pattern generator. Because of misregistration and misconvergence, the line will not appear to be a single smooth line, but rather have a somewhat jagged appearance. A human eye is particularly good at locating a trend line in each individual segment and in detecting small shifts in the collinearity of adjacent segments. In addition, by visually connecting the trend lines from multiple sets of like colored segments, a viewer's sensitivity to detecting shifts is further increased. Both of these features advantageously impart a high degree of sensitivity into the collinear pattern to misregistration and misconvergence. The line segments are not required to have the same thickness or intensity. Note that there is no color blending or overlap, either of which reduces sensitivity.

Sensitivity is further enhanced by introducing blinking, where the colors in the segments are repeatedly switched in time from alternating colors to a single common color and then switched back again to alternating colors. The single common color is the color that appears dimmest to the human eye. For example, blue is the common color for green-blue or red-blue patterns; red is the common color for red-green patterns. The time period during which the single common color appears provides a baseline visual reference for perfect registration. If the other colors are not perfectly registered with a baseline color, then the eye will see apparent movement of the blinked line segments (hereinafter referred to as "blinking motion") each time the colors change. This calls the viewer's, i.e. an operator's, attention to the misregistered segments and further increases the sensitivity to misregistration and misconvergence. The operator's detection of such blinking motion is automatic and involuntary because the eye is especially sensitive to movement in the visual field.

In an alternate embodiment, the operator is replaced by automatic signal processing circuitry in which amplitude and relative timing of the red, green and blue video signals that depict the pattern, such as those generated by a camera imaging the pattern displayed on a CRT display under test, are analyzed using electronic circuitry. The blink rate can be the frame rate of the video signal, normally about 60 Hz. High speed blinking establishes an accurate baseline signal from which a misconvergence offset signal can be accurately detected with high sensitivity. Rapid permutations of the segment colors allow all combinations of the primary colors to be measured virtually at the same time.

BRIEF DESCRIPTION OF THE DRAWINGS

In order that my invention may be fully understood, the preferred embodiments will be described with reference to the accompanying drawings, in which.

DETAILED DESCRIPTION

A. Color Collinearity

Figure 1A:
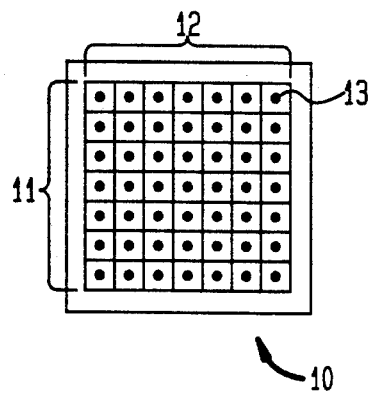
FIG. 1A shows a prior art crosshatch and dot pattern on a display screen 10.
Figure 1B:
FIGS. 1B and 1C show enlarged sections of a line, in the prior art pattern shown in FIG. 1A, in perfect and imperfect registration, respectively.
Figure 1C:
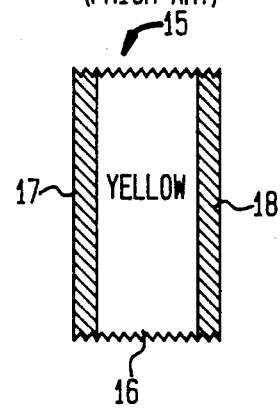
Figure 2A:
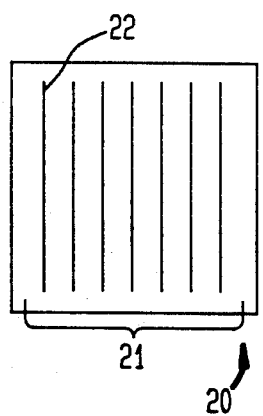
FIG. 2A shows vertical lines 21 generated on a display screen 20 wherein such lines are divided into segments with alternating colors in with my inventive technique.
Figure 2B:
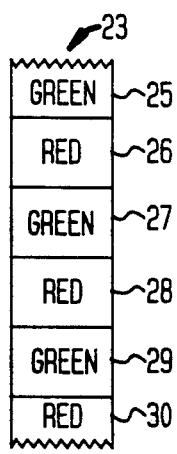
FIGS. 2B and 2C show enlarged sections of lines 23 and 24 in perfect and imperfect registration, respectively, within lines 21 shown in FIG. 2A.
Figure 2C:
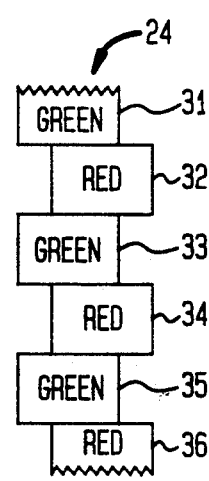

This discussion will first begin with color collinearity as embodied in my invention. Referring to FIG. 2A, seven vertical lines, collectively identified as lines 21, are generated on display screen 20. Each line is divided into 21 segments that have alternating primary colors, for example, red and green, as in the figure. FIG. 2B shows an enlarged section of one of the lines, for example, line 23, with several segments, 25 through 30, in perfect registration. FIG. 2C shows an enlarged section of one of the lines, for example, line 24, with several segments, 31 through 36, misregistered in the horizontal direction. An operator viewing this pattern on display screen 20 determines a degree of misregistration or misconvergence of the display from the jaggedness of the displaced lines. Shifts as small as one-tenth of a line width are visually detectable. This procedure is depicted and examined for each combination of primary colors: red-green, green-blue, and red-blue. This procedure only needs to be performed for two primary color combinations inasmuch as the procedure becomes redundant for the third color combination. To investigate misregistration and misconvergence in the vertical direction, seven similar, but horizontally oriented lines are similarly generated and evaluated.

Figure 4:
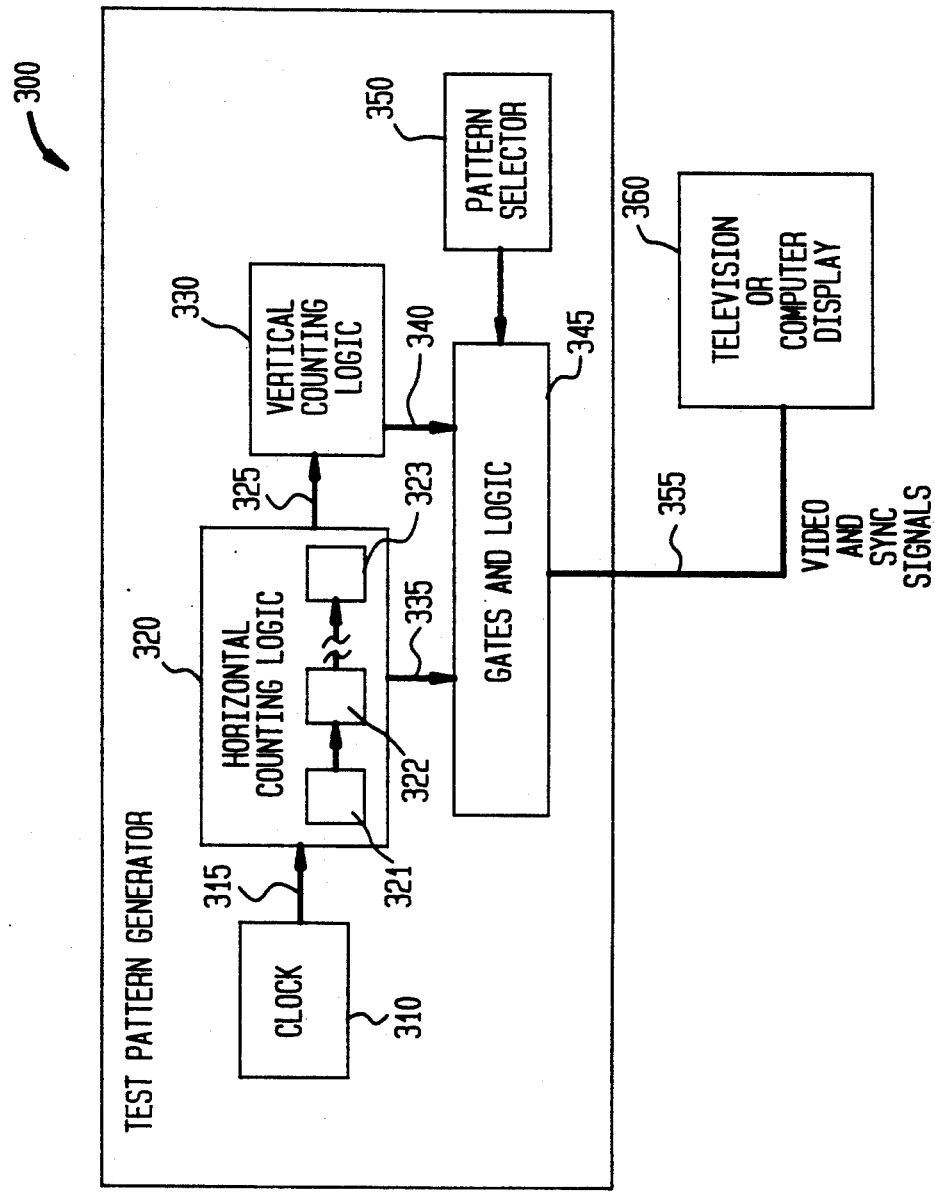
FIG. 4 shows a test pattern generator for producing blinking collinear segmented lines on a television or computer display.

FIG. 4 shows apparatus necessary to generate these test patterns on a television or computer display. Clock 310 operates at a frequency that is approximately 25 times a horizontal scanning frequency. Horizontal counting logic 320 counts from the values "0" to "24." The values from "0" to "20" define an active scan line; values "21" through "24" are used for horizontal retrace and synchronization. Output 325 of horizontal counting logic 320 drives vertical counting logic 330, the latter counting from the values "0" to "n−1," where "n" is the total number of scan lines per frame. Parallel outputs 335 and 340 from horizontal and vertical counting logic 320 and 330, respectively, drive well-known gates and logic 345, which generates synchronization and video test signals. For example, to generate seven horizontal lines in a frame with 481 viewable scan lines, circuitry in gates and logic 345 is arranged to produce a true ON logic value for vertical counter states 0, 80, 160, 240, 320, 400, 480, which produces a one volt video signal for display 360. For all other lines the video signal is set OFF, i.e., zero volts, which is black. The output of a first stage of a horizontal binary counter 321 is used to specify the color in the gates and logic 345. A logical value of OFF corresponds to color1; a logical value of ON corresponds to color2. Pattern selector 350, which is normally a switch under human operator control, specifies which of the three primary colors is activated by the color1 signal and the color2 signal. For example, if color1 is red and color2 is green, each of the seven horizontal lines will have 21 color segments that alternate between red and green. Similar logic is used to generate seven vertical lines. The video controller of most computer displays can also be configured to produce this pattern.

Figure 5:
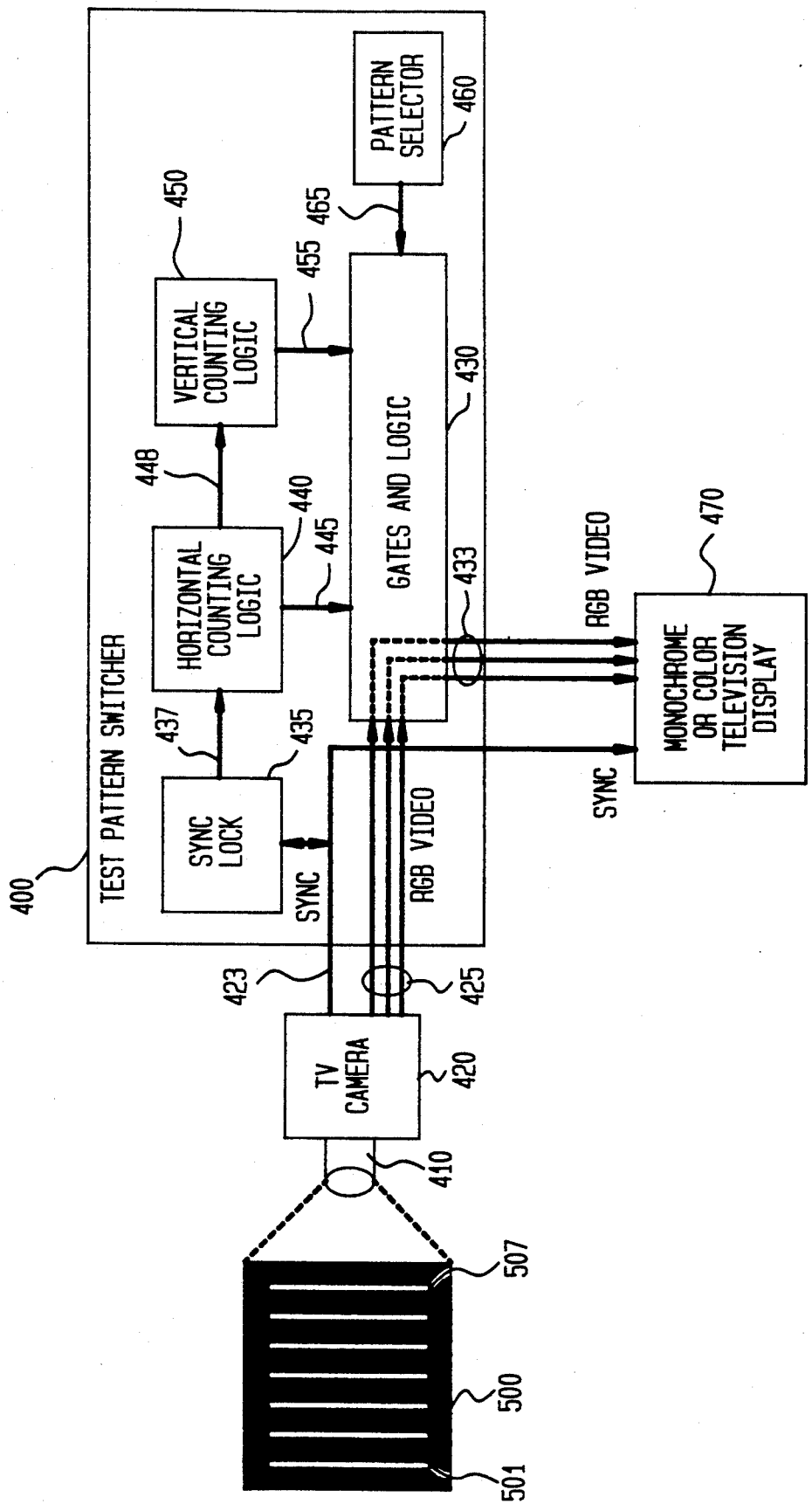
FIG. 5 shows a video camera 420 imaging test chart 500 and test pattern switcher 400 for producing blinking collinear segmented lines on monochrome or color display 470 that is used to evaluate registration and convergence of the camera in accordance with my inventive technique.

FIG. 5 shows apparatus necessary to generate these test patterns for evaluating misregistration and misconvergence in a color camera. The camera is focused on test chart 500 that is all black except for seven vertical white lines of which line 501 is illustrative. The seven lines should fill an image produced by the camera as completely as possible, with line 501 positioned close to the left edge of the image and line 507 positioned close to the right edge of the image. The separate red, green, and blue signals from the camera are sent through test pattern switcher 400. At any instant the switcher blocks two of the three primary colors and passes the remaining color selected for the current screen position to the video display. The functioning of the switcher is identical to the test pattern generator of FIG. 4 except that gates and logic 430 now switch camera color signals 425 on and off rather than generate the signals internally as in gates and logic 345 in FIG. 4. As shown in FIG. 5, output signals 433 of switcher 400 are fed to television display 470. Synchronization locking circuits 435 align horizontal and vertical phases of the test pattern switcher to the camera input signal. The operation of the synchronization locking circuits is well-known and therefore is not shown or described hereinafter. The video display can be either color or monochrome. If the display is monochrome, the three primary color signals are combined into a single monochrome signal using well-known standard methods. A color display is not necessary because nearly any amount of jaggedness of any misregistered or misconverged lines is readily seen by an operator and the color identity of the segments is already known unambiguously. In fact, a monochrome display is preferred because a color display will itself have misregistration and misconvergence that will introduce errors in the analysis of the camera signal.

B. Blinking Motion

Figure 3A:
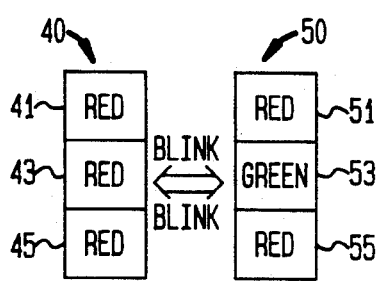
FIGS. 3A, 3B, and 3C show blinking motion for perfect and imperfect registration in various lines that form part of the vertical lines 21 shown in FIG. 2A and in accordance with my inventive technique.
Figure 3B:
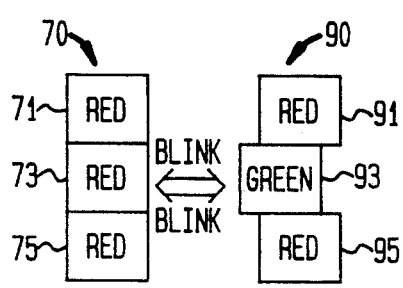
Figure 3C:
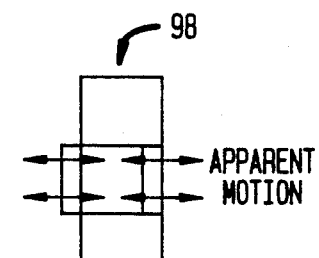

The discussion will now proceed with the addition of blinking motion to the collinear line pattern in accordance with my invention. Reference is now made to FIGS. 3A–3C. Blinking motion is achieved by repeatedly switching from an alternating color pattern to a single common color once a second, simultaneously for all color segments that differ from the single common color. Half of the segments maintain their color and the other half change their color. FIG. 3A shows three segments in a single common color line 40 and an alternating color line 50 which alternate in time between one another. With misregistration or misconvergence present, red segment 73, shown in FIG. 3B, that changes color to green segment 93, will appear to move in position, i.e., so called blinking motion, with a periodicity at the blinking rate. The operator's eye will be automatically drawn to the motion because the eye is especially sensitive to movement in the visual field. Segments 71 and 75 in FIG. 3B that do not change color when displayed as red segments 91 and 95 shown in FIG. 3B form a baseline that acts as a stationary point of reference. Blinking is accomplished in the apparatus in FIGS. 4 and 5 by electronically controlling pattern selector 350 or 460 to automatically alternate once a second between two selectable patterns. Referring now to FIG. 3A, each of the selector patterns is identified by the two alternating colors being generated, color1 and color2. For example, in this figure, for color1, segments 41, 45, 51, and 55 are always red, while for color2, segments 43 and 53 are both selected as red for one second and then selected as green for the next second in a repeating sequence.

Figure 6A:
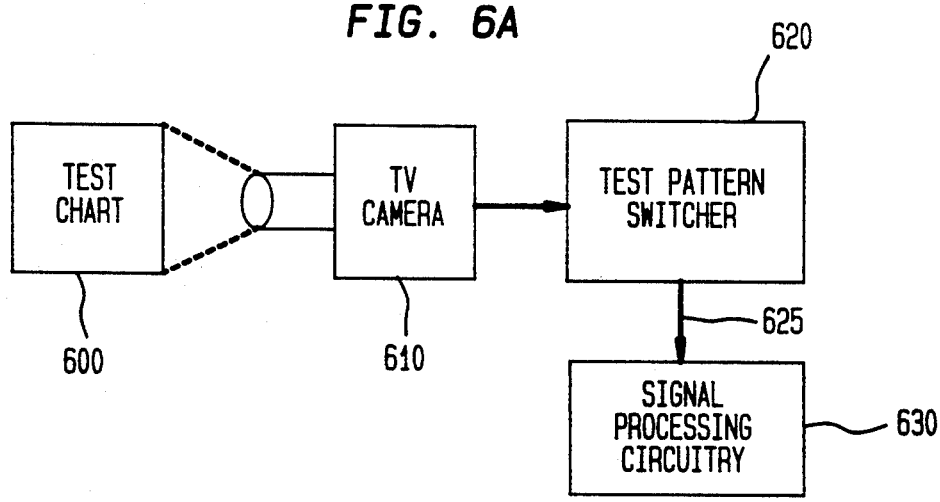
FIG. 6A shows apparatus for automatically measuring misregistration of a color television camera in accordance with my inventive teachings.
Figure 6B:
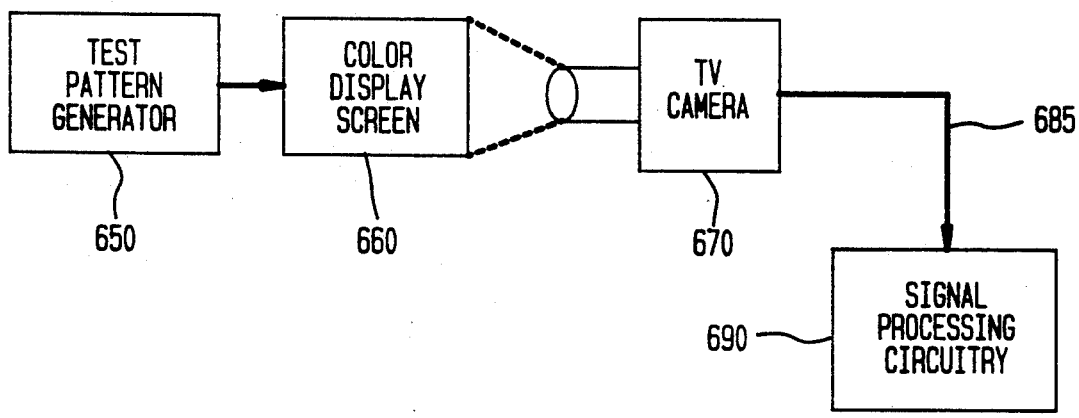
FIG. 6B shows apparatus for automatically measuring misregistration of a color display also in accordance with my inventive teachings.

In an alternate embodiment shown in FIG. 6A, the operator can be replaced by automatic signal processing circuitry 630 in which amplitudes and relative arrival times of video signals are electronically measured. Test chart 600, camera 610, and test pattern switcher 620 are the same as chart 500, camera 420, and switcher 400 as shown in FIG. 5, respectively. The blink rate can be the frame rate of the video signal, normally about 60 Hz. For evaluating the registration of a color camera, the camera's own red, green, and blue video signals are used at output 625, as shown in FIG. 6A, of test pattern switcher 620. The three color signals are first combined in circuitry 630 into a single monochrome signal using well-known standard methods of signal addition. A monochrome signal is preferred because the color identity of the video signal is already known purely from the time of arrival of the signals, since only one primary color is activated at any given time. Use of only a single monochrome channel not only reduces the overall cost of the circuitry, but also increases the measurement accuracy because it is not necessary to cross-calibrate three separate color channels. For automatically evaluating registration of a color television or computer display, a monochrome camera 670 in FIG. 6B is used to image color display screen 660. Test pattern generator 650 is the same as generator 300 shown in FIG. 4. Test pattern switcher 620 shown in FIG. 6A is unnecessary in the embodiment shown in FIG. 6B since monochrome camera 670 is being used therein. In FIG. 6B, signal processing circuitry 690 is the same as circuitry 630 shown in FIG. 6A. The vertical retrace of the camera 670 shown in FIG. 6B must be synchronized to begin concurrent with a change in state of the signal that initiates the change in color blinking state of the test pattern generator 650. In both cases, the resulting monochrome signal is analyzed in the same way.

C. Misregistration

Figure 7:
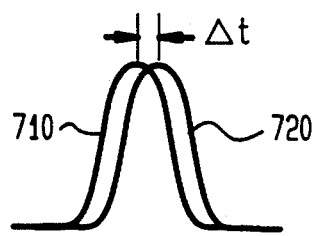
FIG. 7 shows overlapping oscilloscope traces 710 and 720 from blinking colors that are misregistered.

The discussion will now address misregistration in the horizontal direction. Horizontal misregistration is determined by vertical lines 21 as shown in FIG. 2A. To simplify the discussion I will consider one such vertical line, illustratively line 24 shown in FIG. 2C. The vertical position in the image is specified by a particular horizontal scan line number within the camera's raster. In principle, only one scan line at a time is examined, although in practice as many horizontal scan lines as desired can be analyzed by using high speed electronics to perform multiple measurements per image frame. The arrival time of a signal within a scan line, normally specified in micro-seconds between the start of a horizontal synchronization pulse and a peak of a video signal pulse, specifies horizontal position within the image. This time is measured using any one of many standard well-known techniques. Let $t_1$ be the arrival time before a blink, and $t_2$ be the arrival time after a blink. A difference in the arrival times before and after a color blink (i.e. $\Delta t = t_1 - t_2$) indicates a misregistration or misconvergence. Because 60 Hz blinking rapidly alternates between two states, this difference in arrival time, $\Delta t$, can also be easily observed on an oscilloscope as two overlapping traces as shown in FIG. 7. The signal amplitude in this figure refers to the voltage of the monochrome signal derived from the output 625 of the test switcher 620 shown in FIG. 6A or the output 685 of monochrome camera 670 shown in FIG. 6B. Trace 710 refers to the signal before a blink and trace 720 refers to the signal after a blink. Because of the persistence of human vision and of the phosphors on the oscilloscope screen both traces appear to be present simultaneously, allowing a simple visual estimate of the difference in arrival times $\Delta t$. The misregistration $\Delta d$ can be determined from the difference in arrival times. With $\Delta t$ being the difference in arrival times, W the total length of a scan line (raster image width) in millimeters, and T the total time of a visible scan line not including the retrace time (raster image line time), then the misregistration $\Delta d$ in millimeters is given by the equation (1) as follows:

$$\Delta d = \frac{\Delta t}{T} W \quad (1)$$

The peaks of the signals shown in FIG. 7 provide accurate single points of reference for measuring arrival times $t_1$ and $t_2$. Measuring times in terms of the occurrence of these peaks makes the time measurement independent of pulse amplitude and width, which means that the image brightness and line width of the red, green, and blue primary colors do not have to be the same. The most accurate method for measuring arrival time is to determine a centroid of the signal pulse using well-known digital sampling or analog techniques.

Figure 8:
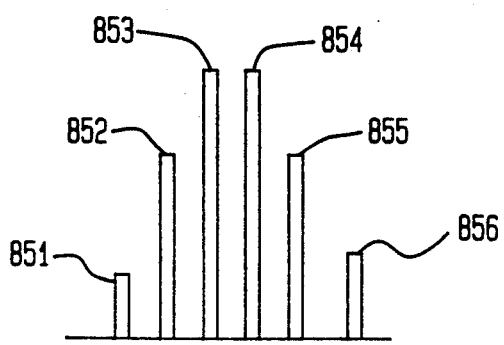
FIG. 8 shows amplitudes of a video signal at a specified time offset (horizontal position) on each of several scan lines (i.e. a vertical slice) for a horizontal line imaged by a camera as several horizontal scan lines.

As to misregistration in the vertical direction, such misregistration is determined by horizontal lines, like lines 501 and 507 shown in FIG. 5, only oriented horizontally instead of vertically as in the figure. A shift in the vertical centroid position of an imaged line before and after a blink is an indication of misregistration. To simplify the discussion we consider only one horizontal line instead of seven. The horizontal line seen by the camera is imaged as several horizontal scan lines of varying intensities. In order to measure the vertical centroid of these scan lines at a given horizontal location within the image, an amplitude of the video signal is measured at a specified time offset from the horizontal synchronization pulse on each scan line as shown in FIG. 8. The centroid can be calculated digitally as a weighted mean of the amplitudes. If $A_i$ is the amplitude of scan line $S_i$, then the centroid position C of the line is given by equation (2) as follows:

$$C = \frac{\sum_i A_i S_i}{\sum_i A_i} \quad (2)$$

The centroid can also be determined using standard analog circuits. A difference in the position of the centroid before and after a color blink indicates a misregistration or misconvergence. Let $C_1$ be the centroid position before a blink, and $C_2$ be the centroid position after a blink. If H is the raster image height in millimeters, and N is the number of visible image scan lines (not including vertical retrace), then the misregistration $\Delta d$ in millimeters is given by equation (3) as follows:

$$\Delta d = \frac{C_2 - C_1}{N} H \quad (3)$$

Alternatively, to evaluate the registration of a television or computer display, one can simply rotate the monochrome imaging camera by 90 degrees or use a second camera oriented in that fashion and proceed exactly as in the case for the vertical lines discussed in the previous paragraph.

Clearly, it is readily apparent to those skilled in the art that, given my inventive teachings, many variations and modifications can be made to the present invention. For example, instead of using only two alternating colinear elements, three or more alternating colors may be used. Furthermore, nearly any number of lines and segments can be used. Additionally, both horizontal and vertical blinking colinear elements may be present simultaneously. Further, the baseline color and the blink rate may be varied, as desired. Also, diagonal and skew colinear elements may be used, and adjacent sets of colinear lines need not be parallel.

I claim:

1. Apparatus for detecting color misrepresentation and misconvergence in a video camera or video display comprising:
    means for generating first and second color collinear patterns, wherien said first color collinear pattern consists of a line having a single color and said second color collinear pattern consists of a line having a repeating pattern of successive color line segments;

means for periodically and alternatingly selecting between said first and second color collinear patterns; and means for displaying said selected collinear pattern on a screen of a video display under test or on a screen of a video display connected to a video camera under test.

2. The aparatus as claimed in claim 1 wherein said first color collinear pattern consists of a plurality of like colored line segments and wherein said second color collinear pattern consists of said first color collinear pattern having every other line segment a different color as compared to said color of said first color collinear pattern.

3. The apparatus as claimed in claim 1 wherein said pattern generating means further includes means for creating said patterns from video signals produced by said video camera under test as the camera images a pre-defined test pattern.

4. The apparatus as claimed in claim 1 further including means for detecting variations in said display as said first and second color collinear patterns are displayed, whereby said variations indicate color misregistration and misconvergence.

5. The apparatus as claimed in claim 4 wherein said line of said first and second patterns is vertically oriented, and said detecting means further includes:

means for measuring a first duration equivalent to the time required for a video scan line of said video display under test or camera under test to reach a video signal maximum relative to a horizontal synchronization pulse that begins said video scan line during said first color collinear pattern generation, means for measuring a second duration equivalent to the time required for a video scan line of said video display under test or said camera under test to reach a video signal maximum relative to a horizontal synchronization pulse that begins said video scan line during said second color collinear pattern generation, and means for calculating a difference between said first duration and said second duration, whereby said difference indicates color misregistration and misconvergence.

6. The apparatus as claimed in claim 4 wherein said first and second patterns are each horizontally oriented, and said detecting means further includes:

means for determining a first video signal amplitude centroid position during said first color collinear pattern generation, means for determining a second video signal amplitude centroid position during said second color collinear pattern generation, and means for calculating a difference between said first centroid position and said second centroid position, whereby said difference indicates color misregistration and misconvergence.

7. The apparatus as claimed in claim 1 wherein said first pattern consists of a line having a single primary color and said second pattern consists of a repeating pattern of alternating primary color line segments.

8. The apparatus as claimed in claim 1 wherein said first pattern consists of a line having a single primary color and said second pattern consists of a repeating pattern of color line segments having a plurality of colors.

9. A method for detecting color misrepresentation and misconvergence in a video camera or video display comprising the steps of:

generating first and second color collinear patterns, wherein said first color collinear pattern consists of a line having a single color and said second color collinear pattern consists of a line having a repeating pattern of color line segments;

periodically and alternatingly selecting between said first and second color collinear patterns; and displaying said selected collinear pattern on a screen of a video display under test or on a screen of a video display connected to a video camera under test.

10. The method as claimed in claim 9 wherein said generating step further includes the steps of:

generating said first color collinear pattern consisting of a line having a plurality of like colored segments; and generating said second color collinear pattern by changing the color of every other colored segment of said first color collinear pattern.

11. The method as claimed in claim 9 wherein said pattern generating step further includes the steps of creating said patterns from video signals produced by said video camera under test as the camera images a pre-defined test pattern.

12. The method as claimed in claim 9 further including the steps of detecting variations in said display as said selected color collinear patterns are displayed, whereby said variations indicate color misregistration and misconvergence.

13. The method as claimed in claim 12 wherein said line of said first and second patterns is vertically oriented, and said step of detecting further includes the steps of:

measuring a first duration equivalent to the time required for a video scan line of said video display under test or said camera under test to reach a video signal maximum relative to a horizontal synchronization pulse that begins said video scan line during said first color collinear pattern generation, measuring a second duration equivalent to the time required for a video scan line of said video display under test or said camera under test to reach a video signal maximum relative to a horizontal synchronization pulse that begins said video scan line during said second color collinear pattern generation, and calculating a difference between said first duration and said second duration, whereby said difference indicates color misregistration and misconvergence.

14. The method as claimed in claim 12 wherein said first and second patterns are each horizontally oriented, and said step of detecting further includes the steps of:

determining a first video signal amplitude centroid position during said first color collinear pattern generation, determining a second video signal amplitude centroid position during said second color collinear pattern generation, and calculating a difference between said first centroid position and said second centroid position, whereby said difference indicates color misregistration and misconvergence.

* * * * *